(12) United States Patent
Foege et al.

(10) Patent No.: US 8,746,427 B2
(45) Date of Patent: Jun. 10, 2014

(54) FRICTION LAMELLA

(75) Inventors: Volker Foege, Ebensee (AT); Gerhard Hartner, Bad Wimsbach (AT)

(73) Assignee: Miba Frictec GmbH, Laakirchen (AT)

( * ) Notice: Subject to any disclaimer, the term of this patent is extended or adjusted under 35 U.S.C. 154(b) by 1012 days.

(21) Appl. No.: 12/584,427

(22) Filed: Sep. 4, 2009

(65) Prior Publication Data

US 2010/0059326 A1 Mar. 11, 2010

(30) Foreign Application Priority Data

Sep. 5, 2008 (AT) ................................ A 1387/2008

(51) Int. Cl.
*F16D 13/60* (2006.01)
*F16D 13/74* (2006.01)

(52) U.S. Cl.
USPC ............... 192/70.14; 192/113.36; 192/107 C

(58) Field of Classification Search
USPC .............................. 192/113.36, 70.14, 107 C
See application file for complete search history.

(56) References Cited

U.S. PATENT DOCUMENTS

| | | | |
|---|---|---|---|
| 3,198,295 A * | 8/1965 | Fangman et al. | 188/264 E |
| 4,537,299 A | 8/1985 | Fukatani | |
| 5,605,210 A * | 2/1997 | Koike et al. | 192/3.29 |
| 2002/0017435 A1 | 2/2002 | Feldmann et al. | |
| 2003/0196864 A1* | 10/2003 | Brooks | 192/70.12 |
| 2007/0017769 A1 | 1/2007 | Mordukhovich et al. | |
| 2007/0199789 A1* | 8/2007 | Nishida et al. | 192/70.12 |

FOREIGN PATENT DOCUMENTS

| | | |
|---|---|---|
| DE | 32 24 436 | 1/1983 |
| DE | 100 15 206 | 10/2000 |
| EP | 0 267 027 | 5/1988 |
| ZA | 2000 1655 | 10/2001 |

\* cited by examiner

*Primary Examiner* — David D Le
*Assistant Examiner* — Ryan Dodd
(74) *Attorney, Agent, or Firm* — Collard & Roe, P.C.

(57) ABSTRACT

The invention relates to a friction lamella (1) comprising a disk-shaped carrier element (2) having a first surface (3) and a second surface (4) opposite thereto, a first friction lining (5) being situated on the first surface (3) and a second friction lining (6) being situated on the second surface (4), which are formed from a composite material, comprising a resin and a fibrous material, and grooves (9, 10) being situated in the first and in the second friction linings (5, 6), which divide the friction linings (5, 6) into segments (7, 8) at least in surface-proximal areas. The segments (7) of the first friction lining (5) are implemented offset by a defined offset angle (11) to the segments (8) of the second friction lining (6). Furthermore, the invention relates to a method and a device for producing the friction lamella and the use of the friction lamella.

11 Claims, 2 Drawing Sheets ns, but it varies within a range. A check is only possible with
FRICTION LAMELLA

CROSS REFERENCE TO RELATED APPLICATIONS

Applicant claims priority under 35 U.S.C. §119 of Austrian Application No. A 1387/2008 filed on Sep. 5, 2008.

The invention relates to a method for setting the compressibility of a friction lamella within a tolerance range, the friction lamella comprising a disk-shaped carrier element, having a first surface and a second surface opposite thereto, a first friction lining being situated on the first surface and a second friction lining being situated on the second surface, which are formed from a composite material, at least comprising a resin and a fibrous material, and grooves being implemented in the first and the second friction linings which divide the friction linings into segments at least in surface-proximal areas, and the friction linings then being compacted, a friction lamella comprising a disk-shaped carrier element having a first surface and a second surface opposite thereto, a first friction lining being situated on the first surface and a second friction lining being situated on the second surface, which are formed from a composite material, comprising a resin and a fibrous material, grooves being situated in the first and in the second friction linings, which divide the friction linings into segments at least in surface-proximal areas, a device for producing this friction lamella, having a receiving unit for receiving a friction lamella blank, a unit for producing grooves in the friction linings, a compaction unit, using which the friction lamella blank is compacted, and optionally having a reversing unit, using which the friction lamella is reversed, and the use of the friction lamella.

All-wheel drives have enjoyed ever greater popularity in recent years not only in the off-road vehicle sector but rather also in sporting oriented vehicles. Modern all-wheel concepts not only improve the traction, but rather also provide a large contribution to improving the vehicle dynamics while simultaneously increasing the driving safety. For this purpose, for example, torque vectoring is of decisive significance for the targeted situation-adapted distribution of the drive torque via lamellar clutches. This can be achieved via various systems.

Both paper friction linings and also carbon friction linings may be used as the friction materials in the lamellar clutches. These friction materials display very positive properties in the coefficient of friction curve, coefficient of friction consistency, coefficient of friction level, etc., as a function of the particular driving states and/or usage conditions.

Compared to metallic friction materials (sintered linings, molybdenum, etc.), composite linings have the disadvantage of higher compressibility.

The functionality of the all-wheel drive concept lives on the reaction capability and rapidity of the individual shifts, which must be regulated via electronics. The compressibility of the materials has significant influence here, because the shift distance significantly increases in a lamellar packet of three to ten lining lamellae. In a certain range, the electronics can compensate for this influence through special programs, in that a defined travel distance is already preset, however, limits are also set here.

Therefore, keeping the compressibility of the clutch, especially the entire lamellar packet, in very narrow tolerances is indispensable for these systems.

The friction materials paper and carbon, which are used, have a certain compressibility, which can be set during curing and/or gluing on the steel carriers. The compression can be set via the curing time, curing temperature, and the lining thickness, but it varies within a range. A check is only possible with increased effort. Due to the processing, the raw material may vary in weight per unit area and resin content, which strongly influences the porosity and thus the compressibility of the friction material.

It is therefore the object of the present invention to disclose a possibility, using which friction lamellae may be provided under normal production conditions, whose compressibility only varies within a pre-definable tolerance range.

This object is independently achieved by each of the methods cited at the beginning, according to which the segments of the first friction lining are implemented as offset by a defined offset angle to the segments of the second friction lining, by the friction lamella, which is produced according to the method in particular, in which the segments of the first friction lining are implemented offset by a defined offset angle to the segments of the second friction lining, and by the devices, in which either a rotation unit is situated, using which the friction lamella blank is pivoted after the reversal by a definable offset angle relative to its position during the production of the grooves in the first friction lining or the unit for producing the grooves comprises an upper stamp and a lower stamp, which each have projections for generating the grooves, the projections of the upper stamp being offset by a definable offset angle to the projections of the lower stamp.

As has been shown in studies in the scope of the invention, even a slight offset of the segments of the first and second friction linings to one another causes a noticeable change of the compression ratio of the friction lamella. It is suspected that the compressibility increases if the individual segments of the first and the second friction linings are no longer supported entirely on one another, although a metallic carrier element is situated between the friction linings. Thus, through a simple change of the production method, in that the segments of the second friction lining are situated pivoted by a defined angle on the friction lamella relative to the segments of the first friction lining, the compressibility of a friction lamella can be set in a desired tolerance range, so that the friction lamellae produced according to the method have uniform properties in regard to the compressibility within this tolerance range. It is thus possible therewith to "equalize" variations in the raw materials, such as the weight per unit area of the paper and/or the resin content of the friction lining, within this tolerance range, whereby not only can the testing effort during the production of friction lamellae of this type be reduced, but rather also a cost-effective changeover of known methods from the prior art is thus also achieved, in that only a corresponding rotation unit is provided in the known device for producing the friction lamellae, in order to achieve the pre-definable offset of the relative position of the segments to one another and/or corresponding stamps are provided for embossing the grooves, which have projections offset by this appropriate offset angle to produce the grooves. It is thus possible therewith to produce friction lamellae having a higher quality and/or to decrease discards during the production of friction lamellae of this type. In addition, a defined compressibility of the friction lamellae may be produced via the offset angle itself, i.e., the absolute value of this offset angle, and a corresponding simple adaptation of the compressibility to different applications of friction lamellae of this type is thus possible. Thus, using the method according to the invention and the device according to the invention, a high degree of automation is achievable with at least approximately uniform properties in regard to the compressibility.

To reduce the tolerance range, it is advantageous if a ratio of a value of a pressure in $N/mm^2$ selected for the compaction of the friction linings to the value of the offset angle in degrees is set to a value selected from a range having a lower limit of 15:20 and an upper limit of 15:1.

To improve this effect, this ratio can be selected from a range having a lower limit of 15:15 and an upper limit of 15:5.

In particular, it is advantageous if the tolerance range of the compression is set to a value of 0.15% to 2.5%, because friction lamellae which are suitable for greatly varying applications may thus be produced.

However, it is also advantageous if the tolerance range of the compression is set to a value from 0.3% to 1.5%.

The segments of the first friction lining may be offset by at most half of a circular arc length, which is defined by these segments, to the segments of the second friction lining. The circular arc length is related to the outer circumference of the friction lamella. There is thus a great variance of the tolerance range in relation to the desired compression. Through the at most at least approximately central configuration of the groove of the first friction lining in the corresponding segment of the second friction lining (viewed in a top view of the friction lamellae), the compression ratio can be made uniform over the entire segment.

It is advantageous if the offset angle is at least great enough that the grooves of the first and the second friction linings are at least situated adjacent to one another viewed in a top view. In this way, the curve of the compressibility as a function of the offset angle follows a linear function, whereby the setting capability of the tolerance range can be performed more easily and/or the tolerance range itself can also be kept in narrower limits while simultaneously having a large "equalization capability" of processing-related variations of the essential parameters.

In order to be able to better take the influence of the groove width in the friction linings on the compressibility into consideration, it is advantageous if the ratio of the groove width in mm to a segment width in mm on the outermost circumference of the friction lining is selected from a range having a lower limit of 2:30 and an upper limit of 1:4.

In particular, this ratio can also be selected from a range having a lower limit of 2:25 and an upper limit of 2:20.

For the same reason, it is advantageous if a ratio of the offset angle in degrees to a groove width in mm is selected from a range having a lower limit of 0.1:3 and an upper limit of 30:2 and/or is selected in particular from a range having a lower limit of 0.1:4 and an upper limit of 25:5.

In order to take the number of grooves per friction lining into consideration better in regard to the compressibility of the friction lining, it is advantageous if the ratio of a segment area in mm$^2$ to a groove width in mm is selected from a range having a lower limit of 20:1 and an upper limit of 300:1.

In particular, this ratio can be selected from a range having a lower limit of 40:1 and an upper limit of 120:1.

It is also advantageous if the lining thickness of the friction linings themselves is taken into consideration in regard to the compressibility, in that a ratio of the lining thickness of the friction linings in mm to the value of the offset angle in degrees is selected from a range having a lower limit of 1:40 and an upper limit of 2:1.

In particular, this ratio can be selected from a range having a lower limit of 1:20 and an upper limit of 3:1.

Furthermore, it can be provided that the segments of the first friction lining have a greater segment width than the segments of the second friction lining, each measured on the outermost circumference. A flattening of the function defining the dependence of the compressibility on the degree of the offset angle is thus achievable, so that variations in the raw materials, i.e., for example, the weight per unit area of the paper used or the degree of impregnation of the paper with resin, may be equalized better.

It is also advantageous if the friction linings are produced having a porosity which is selected from a range having a lower limit of 60% and an upper limit of 80% of the solid density, i.e., the density of the solid material. Due to this porosity, the friction linings have a high oil absorption capability. Because liquids are known to be incompressible, the tolerance range of the compressibility can be reduced further in friction lamellae in wet applications, i.e., oil-impregnated, taking the offset angle into consideration.

It is advantageous if a ratio of the value of the porosity in % to the value of the offset angle in degrees is selected from a range having a lower limit of 10:1 and an upper limit of 55:1.

In particular, this value of the ratio can also be selected from a range having a lower limit of 15:1 and an upper limit of 40:1.

Finally, the possibility exists that the grooves are implemented having a widening cross-section starting from a groove base. In this way, friction lamellae of this type have a better oil guiding capability, while simultaneously having a narrow tolerance range of the compressibility.

For better understanding of the invention, it is explained in greater detail on the basis of the following figures.

In the figures, which are strongly schematic simplified illustrations:

Figure 1:
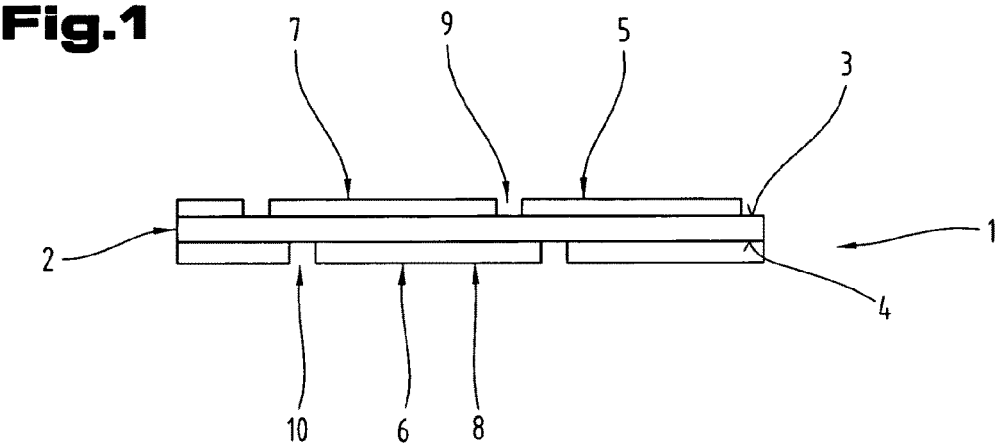
FIG. 1 shows a friction lamella in a side view.

As an introduction, it is to be noted that identical parts are provided with identical reference numerals and/or identical component identifications in the different embodiments described, the disclosures contained in the entire description being able to be transferred accordingly to identical parts having identical reference numerals and/or identical component identifications. The location specifications selected in the description, such as top, bottom, side, etc., are also related to the figure immediately described and shown and are to be transferred accordingly to the new location in the event of a location change.

All specifications on value ranges in the present description are to be understood to mean that they comprise arbitrary and all subranges thereof, e.g., the specification 1 to 10 is to be understood to mean that it also comprises all subranges, starting from the lower limit 1 and the upper limit 10, i.e., all subranges begin with the lower limit of 1 or greater and end at an upper limit of 10 or less, e.g., 1 to 1.7, or 3.2 to 8.1, or 5.5 to 10.

Figure 2:
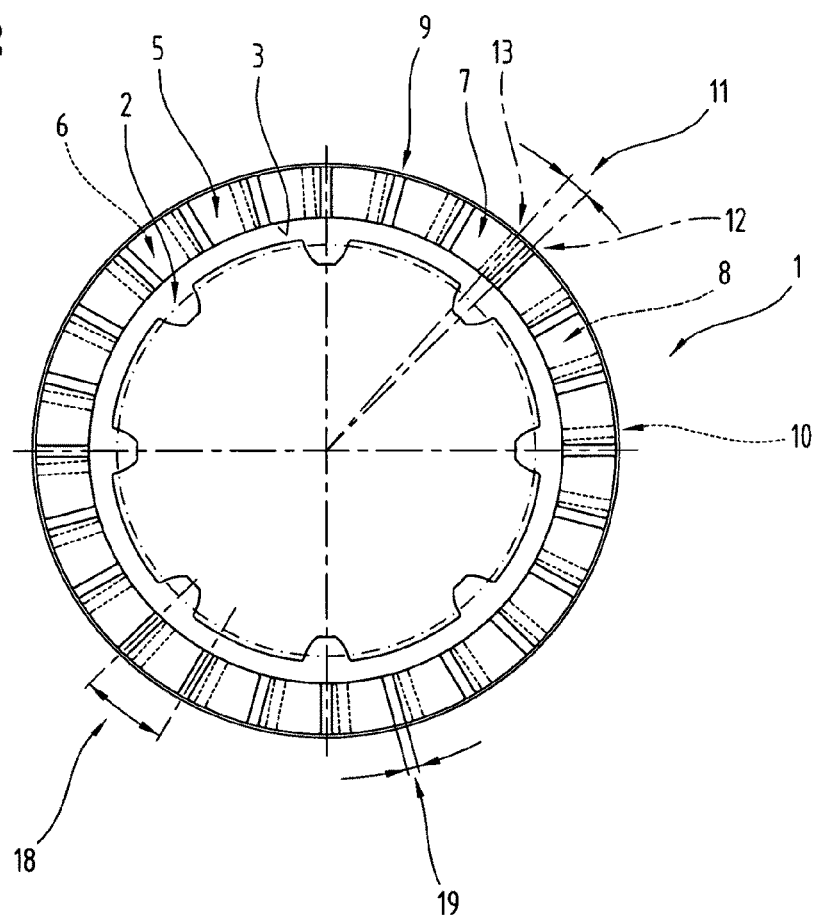
FIG. 2 shows the friction lamella from FIG. 1 in a top view.

FIGS. 1 and 2 show a friction lamella 1 in a side view and a top view, respectively. This friction lamella 1 comprises a carrier element 2, on which a friction lining 5, 6 is situated on each of the diametrically opposite surfaces 3, 4, and is glued in particular to the carrier element 2.

Both the carrier element 2 and also the friction linings 5, 6 may be implemented according to the prior art. In particular, the carrier element 2 is made of a metal material, such as steel. The friction linings 5, 6 typically comprise a fibrous material impregnated with a resin, such as a paper, carbon fibers, aramid fibers, etc. For example, a phenol resin, a phenol/formaldehyde resin, an epoxide resin, a melamine resin, a cyanate resin, etc., or resin mixtures can be used as the resin. The proportions of the resin on the friction linings 5, 6 also range in typical quantities, for example, between 15 wt.-% and 85 wt.-% relative to the particular friction lining 5, 6. Diverse auxiliary materials and processing agents may also be added.

Because friction linings 5, 6 having compositions of this type are the prior art, reference is made to the relevant prior art to avoid repetitions.

As is obvious from these FIGS. 1, 2, the circular friction linings 5, 6—it is to be noted here that these friction linings 5, 6 do not necessarily have to be implemented as circular—are divided into segments 7, 8, grooves 9, 10 being implemented, in particular embossed, between each two adjacent segments 7, 8. However, the possibility also exists that these grooves 9, 10 are cut or punched with the aid of cutting tools into the friction linings 5, 6. These grooves 9, 10 are known to be used for guiding oil in order to produce the appropriate lubrication and/or to dissipate heat which arises because of the friction with a friction partner of the friction lamella 1.

These grooves 9, 10 may also extend over a subarea of the thickness of the friction linings 5, 6 or over the entire thickness, i.e., up to the carrier element 2.

A friction lamella 1 of this type is produced, in simplified form, in such a way that firstly the fibrous material is impregnated with the resin, it is then dried and partially or completely cured, and the friction lining 5, 6 is glued to the carrier element 2, possibly after a pre-compaction, and compressed. This method also corresponds to the prior art.

Friction particles such as $SiO_2$, $Al_2O_3$, etc. may optionally also be contained in the friction lining. The friction particles preferably have a mean size between 10 μm and 100 μm, because the compression of the friction linings 5, 6 can thus also be influenced.

In particular, the friction particles may be added in a proportion which is selected from a range having a lower limit of 2 wt.-% and an upper limit of 20 wt.-%, relative to the total weight of the particular friction lining 5, 6.

Friction lamellae 1 of this type may be used individually or assembled into so-called friction packets, for example, between 2 and 15 friction lamellae per packet, in particular in wet-running clutches, differential locks, transfer cases, or torque vectoring applications and/or as a synchronizing ring or dual-cone ring for shift transmissions. Torque vectoring applications are understood, for example, as applications in driving dynamics in which, for example, speed differences of a locking differential are increased by this system. Thus, for example, the steering of a vehicle can be supported, in that the drive torques are distributed unequally to the wheels. A higher torque can thus be deflected to the wheel on the outside of the curve, so that in normal driving conditions oversteering behavior can be set.

It is provided according to the invention that the grooves 9 of the first friction lining 5 are situated offset to one another relative to the location of the grooves 10 of the second friction lining 6 by an offset angle 11, this offset angle 11 being at least approximately equally great for all grooves 9, 10. As is obvious from FIG. 1 in particular, the grooves 9 do not lie above the grooves 10. The offset angle 11 is measured in the longitudinal extension of the grooves 9, 10 between longitudinal central axes 12, 13 in the plane of the friction linings 5, 6. This offset angle 11 can be selected from a range having a lower limit of 0.1° and an upper limit of 8°, in particular from a range having a lower limit of 1° and an upper limit of 7°, for example, it may be 1.5° or 2° or 3°.

Figure 3:
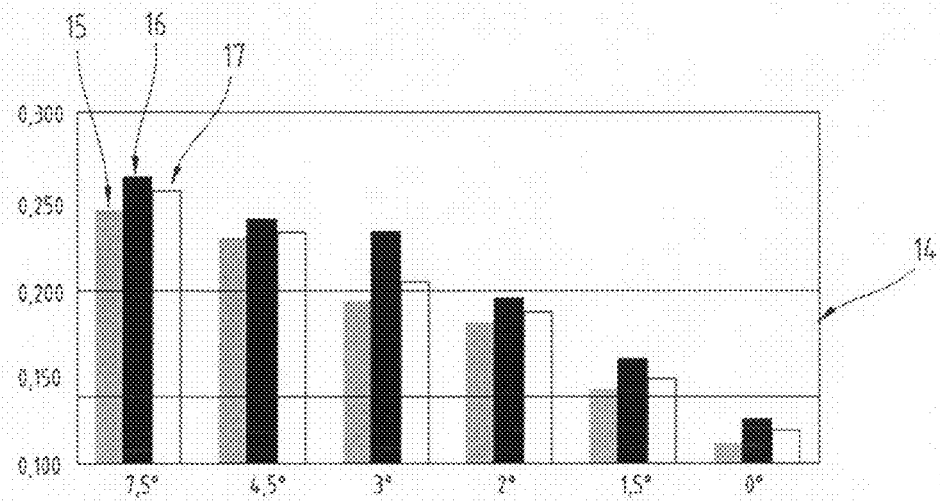
FIG. 3 shows a graph of the dependence of the compressibility on the size of the offset angle of the segments.

Through the offset of the grooves 9, 10 by the offset angle 11, processing-related variations in the raw material, i.e., in the composition of the friction linings 5, 6, i.e., in the resin content and/or the weight per unit area of the fibrous material used, for example, and also variations of the compressibility of the friction linings 5, 6 because of processing-related varying curing times and/or curing temperatures and as a result of minimal deviations of the lining thickness of these friction linings 5, 6 within a tolerance range 14 can be equalized, i.e., the compression of these friction linings 5, 6 is uniform independently of these cited influencing variables within this tolerance range 14, as is obvious from FIG. 3. FIG. 3 shows the influence of the relative segment configuration of the friction linings 5, 6 to one another on the compression, for which purpose the compression is plotted in mm on the ordinate and the offset angle 11 is plotted in degrees on the abscissa in FIG. 3.

This diagram was prepared with the aid of friction lamellae 1, which had friction linings 5, 6 made of phenol resin in a proportion of 30 wt.-% and a paper as the fibrous material having a weight per unit area of 592 $g/m^2$ and which were compressed using a pressure of 50 bar during the production. This friction lamella has a diameter of 125 mm, 24 segments 7, 8 being implemented per friction lining 5, 6. For this purpose, a number of 5 friction lamellae 1 per measured offset angle 11 were tested, the compression being measured using a testing force of 6000 N. A minimal compression 15, a maximal compression 16, and a mean compression 17 as the mean value of the measured compressions are each shown in the same sequence per offset angle.

As is obvious from FIG. 3, in this exemplary embodiment, the offset angle can be selected between 1.5° and 2° for a compression between 0.14 mm and 0.2 mm, without the tolerance range 14 of the compression being left.

Furthermore, it is obvious from FIG. 3 that the compression increases with increasing offset angle 11, because the grooves 9, 10 are further apart from one another in a top view with increasing offset angle 11, so that the individual segments 7, 8 are no longer completely supported on one another.

Figure 4:
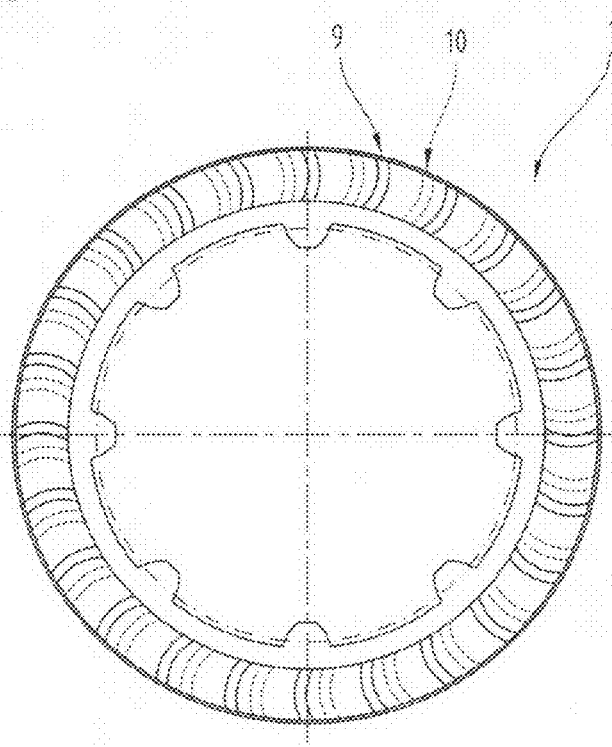
FIG. 4 shows an embodiment variant of a friction lamella in a top view.

FIG. 4 shows an embodiment variant of the friction lamella 1, this FIG. 4, i.e., this embodiment variant, being viewed as representative of other geometric embodiment variants of the grooves 9, 10. According to this embodiment variant of the friction lamella 1, the grooves 9, 10 are implemented curved, i.e., these grooves 9, 10 do not necessarily have to have a radial shape, as is obvious from FIG. 2.

Furthermore, the possibility exists in the scope of the invention that the grooves 9, 10 are implemented having a widening cross-section, starting from a groove base 21 in the area of the carrier element 2, as was already explained above.

The method according to the invention and/or the friction lamella 1 thus offer the advantage that a specific pre-definable compression can be set, which only varies within the tolerance range 14, as a function of the production-related influencing variables cited above on the compressibility of the friction lamella 1 and/or the friction linings 5, 6. Therefore, it is no longer absolutely necessary to determine batch-related differences in the raw materials, i.e., for example, a different resin content of the fibrous material, and/or influencing variables from the production-related curing times and/or curing temperatures per batch and possibly readjust the production method accordingly. The production of friction lamellae of this type is thus simplified overall and can thus be performed cost-effectively.

For better equalization of these individual influencing variables it is possible that a ratio of a value of a pressure in $N/mm^2$ selected for the compaction of the friction linings 5, 6 to the value of the offset angle in degrees is set to a value selected from a range having a lower limit of 15:20 and an upper limit of 15:1.

Furthermore, it has proven to be advantageous if this tolerance range 14 for the above-mentioned applications of the friction lamella 1 is set to a range of 0.15% to 2.5%.

Because of the rising compression with increasing offset angle, it is advantageous if this offset angle 11 is selected at maximum so that the segments 7 of the first friction lining 5 are situated offset by at most half of a circular arc length 18 (FIG. 1) to the segments 8 of the second friction lining 6—viewed in a top view.

Because the dependence of the compression on the dimension of the offset angle 11 has a nonlinear curve at the beginning, i.e., between 0° and approximately 0.5°—as a function of a width 19 (FIG. 1) of the grooves 9, 10—it is advantageous for the production method if the grooves 9, 10 of the first and the second friction linings 5, 6—viewed in a top view—are situated at least adjacent to one another, i.e., there is no overlap of the grooves 9, 10.

For this reason, it is also advantageous if the ratio of the width 19 of the grooves 9, 10 to a segment width is selected corresponding to the circular arc length 18 on the outermost circumference of the friction lining in mm from a range having a lower limit of 2:30 and an upper limit of 1:4 and/or a ratio of the offset angle 11 in degrees to the width 19 of the grooves 9, 10 in mm is selected from a range having a lower limit of 0.1:5 and an upper limit of 25:1 and/or a ratio of a segment area in mm$^2$ to a groove width in mm is selected from a range having a lower limit of 20:1 and an upper limit of 300:1.

Because the lining thickness, i.e., the thickness of the friction linings 5, 6, has an influence on the compression, it is advantageous for the automated production of the friction lamellae 1 if a ratio of this lining thickness of the friction linings 5, 6 in mm to the value of the offset angle in degrees is selected from a range having a lower limit of 1:40 and an upper limit of 2:1.

Furthermore, the possibility exists in the scope of the invention that the segments 8 of the friction lining 6 have a segment width 28 greater than the segment width 27 of the segments 7 of the friction lining 5, each measured on the outermost circumference.

Furthermore, it is advantageous if these friction linings 5, 6 have a porosity corresponding to the above statements and/or a ratio of the value of this porosity to the value of the offset angle in degrees corresponding to the above statements.

The production of these friction lamellae 1 can be performed on a device according to the invention, which largely corresponds to the prior art, i.e., has a receiving unit, e.g., a corresponding mold, for receiving a friction lamella blank, a friction lamella blank being understood to mean that the friction linings 5, 6 are situated uncompacted and/or optionally pre-compacted on the carrier element 2, in particular are glued thereto, and a unit for producing the grooves 9, 10 in the friction linings 5, 6 and a compaction unit, using which the friction lamella blank is compacted during the production. In a first embodiment variant, this device according to the invention can have a reversing unit, as is known in principle, in order to reverse the friction lamella 1, i.e., the friction lamella blank, after the grooves 9 have been produced in the first friction lining 5 so that the second friction lining 6 is situated on top, in order to thus implement the grooves 10 in the second friction lining 6 after the reversal. In this first embodiment variant of the device, a rotation unit, e.g., a turntable connected to a drive unit, is situated, using which the friction lamella blank is pivoted by a defined offset angle 11 relative to its position during the production of the grooves 9 in the first friction lining 5 after the reversal. In particular, it is advantageous if this rotation unit is combined with the reversal unit.

However, the possibility also exists that the device according to the invention, i.e., the compaction device, has an upper stamp and a lower stamp, these two stamps having projections in order to generate the grooves 9, 10 in the friction linings 5, 6 during the compaction of the friction lamella blank, and these projections being implemented offset to one another according to the desired offset angle 11—again viewed in a top view.

The exemplary embodiments show possible embodiment variants of the friction lamella 1, it being noted here that the invention is not restricted to the specially shown embodiment variants thereof, but rather also diverse combinations of the individual embodiment variants with one another are possible and this variation capability is within the technical measures of one skilled in this technical area on the basis of the teaching on the technical measures through the present invention.

Finally, for the sake of completeness it is to be noted that for better understanding of the construction of the friction lamella 1, it and/or the parts thereof are sometimes shown not to scale and/or enlarged and/or shrunken.

LIST OF REFERENCE NUMBERS 1. friction lamella
2. carrier element
3. surface
4. surface
5. friction lining
6. friction lining
7. segment
8. segment
9. groove
10. groove
11. offset angle
12. longitudinal central axis
13. longitudinal central axis
14. tolerance range
15. compression
16. compression
17. compression
18. circular arc length
19. width

What is claimed is:

1. A method for setting the compressibility of friction lamellae within a tolerance range of 0.15% to 2.5%, the method comprising:

assembling between 2 and 15 friction lamellae in a friction packet, each friction lamella of the friction lamellae comprising a disk-shaped carrier element made of a metal material, having a first surface and a second surface opposite thereto, a first friction lining being situated on the first surface and a second friction lining being situated on the second surface, which are formed from a composite material, at least comprising a resin and a fibrous material, providing grooves in the first and in the second friction linings, which divide the friction linings into segments at least in surface-proximal areas, compacting the friction linings, selecting a defined offset angle from a range having a lower limit of 0.1° and an upper limit of 8° and offsetting the segments of the first friction lining by the defined offset angle to the segments of the second friction lining, and selecting a ratio of a groove width in mm to a segment width on the outermost circumference of the friction lining in mm from a range having a lower limit of 2:30 and an upper limit of 1:4.

2. The method according to claim 1, wherein a ratio of a value of a pressure in $N/mm^2$ selected for the compaction to the value of the offset angle in degrees is set to a value selected from a range having a lower limit of 15:20 and an upper limit of 15:1.

3. A friction packet comprising between 2 and 15 friction lamellae, each friction lamella of the friction lamellae comprising a disk-shaped carrier element made of a metal material and having a first surface and a second surface opposite thereto, a first friction lining being situated on the first surface and a second friction lining being situated on the second surface, which are formed from a composite material, comprising a resin and a fibrous material, and grooves being situated in the first and in the second friction linings, which divide the friction linings into segments at least in surface-proximal areas, wherein the segments of the first friction lining are offset by a defined offset angle to the segments of the second friction lining, the defined offset angle being selected from a range having a lower limit of 0.1° and an upper limit of 8°,
   wherein a ratio of a groove width in mm to a segment width on the outermost circumference of the friction lining in mm is selected from a range having a lower limit of 2:30 and an upper limit of 1:4, and
   wherein each friction lamella has a compressibility within a tolerance range of 0.15% to 2.5%.

4. The friction packet according to claim 3, wherein the segments of the first friction lining are offset by at most half of a circular arc length, which is defined by these segments.

5. The friction packet according to claim 3, wherein the offset angle is at least large enough that the grooves of the first and the second friction linings are situated at least adjacent to one another viewed in a top view.

6. The friction packet according to claim 3, wherein a ratio of the offset angle in degrees to a groove width in mm is selected from a range having a lower limit of 0.1:3 and an upper limit of 30:2.

7. The friction packet according to claim 3, wherein a ratio of a segment area in $mm^2$ to a groove width in mm is selected from a range having a lower limit of 20:1 and an upper limit of 300:1.

8. The friction packet according to claim 3, wherein a ratio of a lining thickness of the friction linings in mm to the value of the offset angle in degrees is selected from a range having a lower limit of 1:40 and an upper limit of 2:1.

9. The friction packet according to claim 3, wherein the friction linings have a porosity selected from a range having a lower limit of 60% and an upper limit of 80%, relative to the solid density of the friction linings.

10. The friction packet according to claim 9, wherein a ratio of the value of the porosity to the value of the offset angle in degrees is selected from a range having a lower limit of 10:1 and an upper limit of 55:1.

11. A wet-running friction assembly comprising the friction packet according to claim 3.

* * * * *